United States Patent
Dell et al.

(10) Patent No.: US 10,078,587 B2
(45) Date of Patent: Sep. 18, 2018

(54) MIRRORING A CACHE HAVING A MODIFIED CACHE STATE

(71) Applicant: International Business Machines Corporation, Armonk, NY (US)

(72) Inventors: Timothy J. Dell, Colchester, VT (US); Shwetha Janardhan, Bangalore (IN); Sairam Kamaraju, Bangalore (IN); Saravanan Sethuraman, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/680,153

(22) Filed: Apr. 7, 2015

(65) Prior Publication Data

US 2016/0179671 A1    Jun. 23, 2016

Related U.S. Application Data

(63) Continuation of application No. 14/573,289, filed on Dec. 17, 2014.

(51) Int. Cl.
| | |
|---|---|
| *G06F 12/00* | (2006.01) |
| *G06F 12/0806* | (2016.01) |
| *G06F 12/0811* | (2016.01) |
| *G06F 12/0817* | (2016.01) |
| *G06F 12/0897* | (2016.01) |

(52) U.S. Cl.
CPC ...... *G06F 12/0806* (2013.01); *G06F 12/0811* (2013.01); *G06F 12/0822* (2013.01); *G06F 12/0897* (2013.01); *G06F 2212/1032* (2013.01); *G06F 2212/283* (2013.01); *G06F 2212/313* (2013.01); *G06F 2212/621* (2013.01)

(58) Field of Classification Search
CPC ............ G06F 12/0806; G06F 12/0811; G06F 12/0822; G06F 12/0897
See application file for complete search history.

(56) References Cited

U.S. PATENT DOCUMENTS

| | | | | |
|---|---|---|---|---|
| 2003/0154345 | A1* | 8/2003 | Lyon | G06F 12/0864 711/122 |
| 2008/0082771 | A1* | 4/2008 | Pong | G06F 9/526 711/163 |
| 2010/0161904 | A1* | 6/2010 | Cypher | G06F 12/0811 711/122 |
| 2013/0326269 | A1* | 12/2013 | Losh | G06F 11/2053 714/6.13 |

(Continued)

OTHER PUBLICATIONS

List of IBM Patents or Patent Applictions Treated as Related; (Appendix P), Filed Apr. 7, 2015, 2 pages.

(Continued)

*Primary Examiner* — Gurtej Bansal
(74) *Attorney, Agent, or Firm* — Cantor Colburn LLP

(57) ABSTRACT

In one aspect a method includes determining, by a controller of a memory system, that a cache line of one of a plurality of levels of cache in the memory system has been modified. An aspect also includes copying the modified cache line to an auxiliary storage element, and setting a flag in a cache directory for the modified cache line to indicate a cache state of mirrored modified.

4 Claims, 3 Drawing Sheets

(56) References Cited

U.S. PATENT DOCUMENTS

2014/0201447 A1\* 7/2014 Grandou ............. G06F 12/0804
  711/122
2014/0258637 A1\* 9/2014 Hong .................. G06F 12/0808
  711/135

OTHER PUBLICATIONS

Timothy J. Dell, et al., Pending U.S. Appl. No. 14/573,289 entitled "Mirroring a Cache Having a Modified Cache State," filed Dec. 17, 2014.

\* cited by examiner

MIRRORING A CACHE HAVING A MODIFIED CACHE STATE

DOMESTIC PRIORITY

This application is a continuation of U.S. patent application Ser. No. 14/573,289, filed Dec. 17, 2014, the content of which is incorporated by reference herein in its entirety.

BACKGROUND

The present invention relates to a data processing system, and more specifically, to mirroring a cache that is determined to have a modified cache state.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability computer systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact, such as space, power, and cooling.

SUMMARY

In an embodiment, a method includes determining, by a controller of a memory system, that a cache line of one of a plurality of levels of cache in the memory system has been modified; copying the modified cache line to an auxiliary storage element; and setting a flag in a cache directory for the modified cache line to indicate a cache state of mirrored modified.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
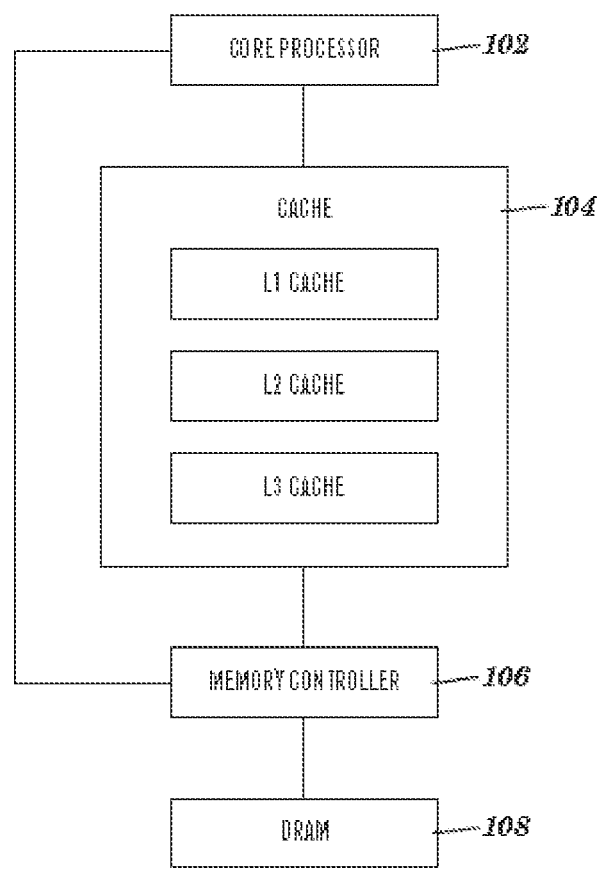
FIG. 1 is a block diagram of a system for mirroring a cache having a modified cache state in accordance with an embodiment.

An embodiment determines a cache state of a cache line as 'modified' and flags the cache with a new cache state referred to herein as "mirrored modified" (MM). The cache line is then copied to another designated location. The other designated location is referred to herein as an auxiliary storage element. When a change is later made to the modified cache line, a corresponding controller identifies the state of the cache line as mirrored modified, and updates the copy of the cache line in the auxiliary storage element. In an alternative embodiment, when a cache line is determined to have been modified, the entire cache associated with the cache line may be flagged as mirrored modified, and the entire contents of the cache may be copied to the other location.

By mirroring modified cache lines in auxiliary storage, should the modified cache line become corrupted, the system can recover the data from the auxiliary location. This also eliminates the need to deconfigure the cache and core processor due to the corrupted data.

While the cache that is subject to the mirroring is described herein as being Level 3 (L3) cache, it will be understood that the cache to be mirrored may be any level of cache having cache lines that are characteristically modified without the data existing in other locations.

A typical entry in a cache directory is made up of several elements (or fields) including an address of the cache line and a state of the cache line (e.g., valid, invalid, modified, exclusive, etc.). Embodiments utilize a state field in the cache directory entry to signify a new state of 'mirrored modified' for a modified cache line. The state of mirrored modified signifies that the modified cache line has a mirrored copy stored in another storage element. The embodiments described herein do not require any specialized hardware, software or tracking registers, with an exception that a new state of 'mirrored modified' is introduced to the cache directory. When a change is made to the modified cache line, the system determines its cache state is modified mirrored, and updates the copy of the cache line in the auxiliary storage location.

As used herein, the term "auxiliary storage element" refers to any addressable unit in a memory device. For example, the addressable unit may be a cache line (or cache block) made up of 128 bytes. The auxiliary storage may be a cache of another processor core or may be a storage element communicatively coupled to the processor core over a bus (e.g., through an interface, such as a Distributed Computing Industry Association (DCIA) interface). In an embodiment, if the processing system includes an IBM® POWERS, the auxiliary storage may be coupled through COHERENT ACCELERATOR PROCESSOR INTERFACE (CAPI). While the auxiliary storage element may be in main memory, it is understood that in order to enhance performance and minimize latency, the use of a lower level cache element or interface connection is described herein as the auxiliary storage element.

Embodiments described herein provide mechanisms for mirroring modified cache lines (or the entire cache itself) in a memory system to provide an auxiliary source of data when a cache is determined to have been corrupted. The memory system may be utilized with data processing devices such as servers, client data processing systems, stand-alone data processing systems, or any other type of data processing device. Moreover, the memory system may be used in electronic devices in which memories are utilized including, but not limited to printers, facsimile machines, storage devices, and flash drives.

FIG. 1 is a block diagram of a system 100 for mirroring a cache that is determined to have a modified cache state in accordance with an embodiment. The system in FIG. 1 includes a memory controller 106 that is in communication with a cache memory 104, a main memory 108 (e.g., dynamic random access memory (DRAM)), and a core processor 102. Though shown as a single block, the main memory 108 may include a plurality of memory devices in one location or in a plurality of locations. The components shown in FIG. 1 can be located on the same integrated circuit or alternatively, they can be distributed among any number of integrated circuits.

In an embodiment, the core processor 102 includes a memory interface that receives addresses of memory locations to be accessed and determines if memory contents associated with the address are stored in the cache memory 104. The cache memory 104 shown in FIG. 1 is an example of a cache subsystem with multiple cache hierarchies. In an embodiment, each level of the cache 104 (level one or "L1", level two or "L2", and level three or "L3") includes its own directory with entries that include an address and current state for each cache line that is stored in the respective cache level (L1, L2, L3). In an embodiment, the current state is "valid" if the entry contains a valid address, "invalid" if the entry does not contain a valid address and may be overwritten by a new cache line, "exclusive" if the entry is the only copy available and owned by a particular cache, and which entry is not available in any other cache in the system, "modified" if the data in the cache line has been modified, and a new state of "modified mirrored" indicating that the modified cache line has been copied to an auxiliary storage location. Typically, the core processor 102 looks for the address in the L1 cache first (the highest cache level in FIG. 1) followed by the L2 cache, and then looks in the L3 cache (the lowest cache level in FIG. 1) if the contents associated with the address are not located in the L1 or L2 cache.

If the address is not located in one of the cache memory directories, then the data is not located in the cache memory 104. The request from the core processor 102 is then forwarded from a cache controller to the memory controller 106 to access the data at the specified address on the DRAM 108. As shown in FIG. 1, the memory controller 106 communicates directly with the DRAM 108 to retrieve data at the requested address. In an embodiment, the memory controller 106 includes read and write buffers and sends row address strobe (RAS) and column address strobe (CAS) signals to the DRAM 108.

Figure 2:
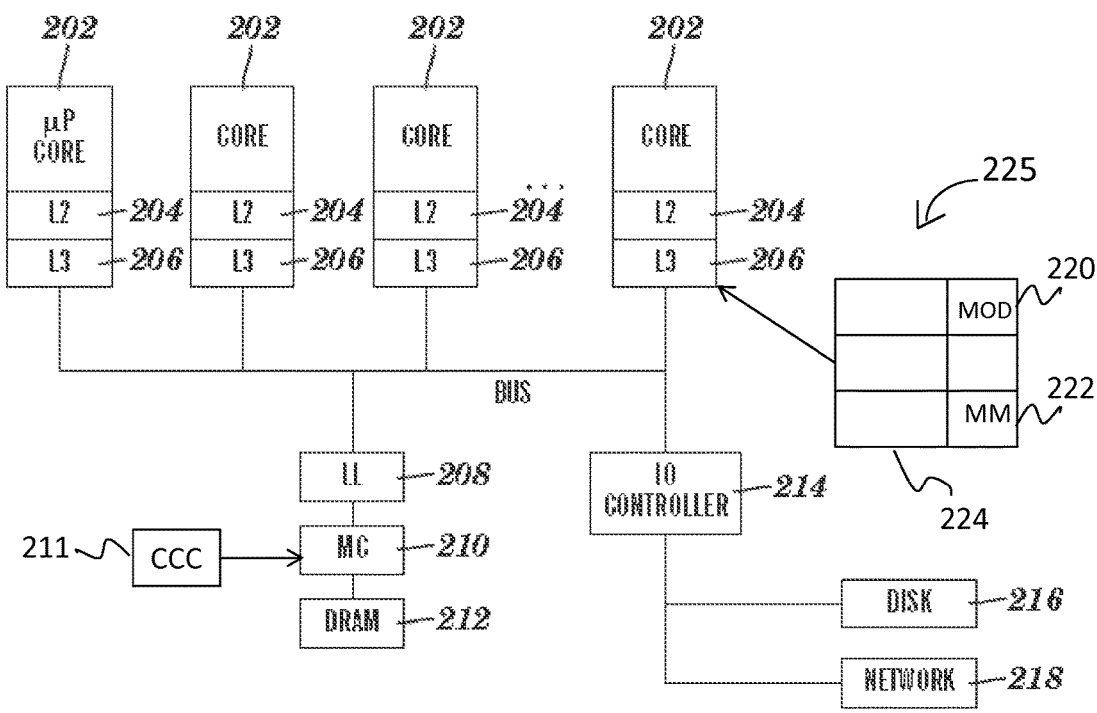
FIG. 2 is a block diagram of a system for mirroring a cache having a modified cache state in accordance with an embodiment.

FIG. 2 is a block diagram of an exemplary multiple-processor (multi-processor) system 200 for mirroring cache having a modified state in accordance with an embodiment. The system in FIG. 2 includes several execution units or core processors 202, with each core processor 202 having its own dedicated high-level caches (L1 cache not shown, L2 cache 204, and L3 cache 206). Each core processor 202 is connected, via a bus to a lower level (LL) cache 208 and to an I/O controller 214. In the embodiment shown in FIG. 2, the I/O controller 214 is in communication with a disk drive 216 (e.g., a hard disk drive or "HDD") and a network 218 to transmit and/or to receive data and commands. Also, the lower level cache 208 is connected to a memory controller 210. In an embodiment, the memory controller 210 includes a cache coherency controller and bus 211 (referred herein as cache coherency controller for simplicity) which, in cooperation with corresponding caches (e.g., using snoopers on the bus of 211), detects a cache line having a modified cache state and initiates the use of a cache line in another L3 cache 206, the LL cache 208, DRAM 212, or in HDD 216 as an auxiliary location for storing a copy of the cache line. In an alternative embodiment, the cache coherency controller 211 may be implemented as a separate system device that is communicatively coupled to the memory controller 210.

As shown in FIG. 2, a cache directory 225, which may reside in each of the caches, and is shown as part of one of L3 caches 206 for illustrative purposes, includes cache lines, each of which may be marked with a cache state of the corresponding cache line. For example, one cache line includes a field that indicates a cache state of modified 220, while another cache line includes a field that indicates a cache state of mirrored modified 222. The cache state of modified 220 indicates to the cache coherency controller 211 that a copy of the cache line needs to be made, while the cache state of mirrored modified 222 indicates that the cache line stores a copy of a cache line that has been modified at another cache. The cache line indicating a mirrored modified state 222 also includes a field 224 that stores the location of the original cache line from which the copy was made.

In an embodiment, operating systems are executed on the core processors 202 to coordinate and provide control of various components within the core processors 202 including memory accesses and I/Os. Each core processor 202 may operate as client or as a server. The system shown in FIG. 2 includes a plurality of core processors 202. In an alternative embodiment, a single core processor 202 is employed.

In an embodiment, instructions for an operating system, application and/or program are located on storage devices, such as disk drive 216, that are loaded into main memory (in the embodiment shown in FIG. 2, the main memory is implemented by DRAM 212) for execution by the core processor 202. The processes performed by the core processor 202 are performed using computer usable program code, which may be located in a memory such as, main memory (e.g., DRAM 212), LL cache 208, L2 cache 204 and/or L3 cache 206. In one embodiment, the instructions are loaded into the L2 cache 204 or the L3 cache 206 on a core processor 202 before being executed by the corresponding core processor 202.

A bus is shown in FIG. 2 to connect the core processors 202 to an I/O controller 214 and the LL cache 208. The bus may be comprised of a plurality of buses and may be implemented using any type of communication fabric or architecture that provides for a transfer of data between different components or devices attached to the fabric or architecture. In addition, FIG. 2 includes an input/output (I/O) controller 214 for transmitting data to and receiving data from, a disk drive 216 and a network 218.

The multi-processor system shown in FIG. 2 may take the form of any of a number of different data processing systems including client computing devices, server computing devices, a tablet computer, laptop computer, telephone or other communication device, a personal digital assistant (PDA), or the like. In some illustrative embodiments, the system shown in FIG. 2 is a portable computing device that is configured with flash memory to provide non-volatile memory for storing operating system files and/or user-generated data, for example. In other illustrative embodiments, the system shown in FIG. 2 is any type of digital commercial product that utilizes a memory system. For example, the system shown in FIG. 2 may be a printer, facsimile machine, flash memory device, wireless communication device, game system, portable video/music player, or any other type of consumer electronic device. Essentially, the system shown in FIG. 2 may be any known or later developed data processing system without architectural limitation.

In the embodiment of the multi-processor system 200 shown in FIG. 2, a DRAM 212 is used for storing programs and data in main memory.

In an embodiment, the cache coherency controller 211 monitors the cache states of the cache lines (e.g., by snooping the data to identify the states). When the cache coherency controller 211 determines that a cache line has a cache state of modified, the cache coherency controller 211 copies the cache line to an auxiliary storage element (e.g., another L3 cache 206, LL 208, DRAM 212, or disk 216). The memory controller 210 notes the storage location of the mirrored cache line for future updates. The memory controller 210 changes the state of the modified cache line to mirrored modified. Thus, should the memory controller 210 determine that the data has been corrupted for the cache line, the memory controller 210 retrieves the location information for the auxiliary storage element and accesses data from the auxiliary storage instead of the original cache.

As indicated above, the cache coherency controller 211 determines a cache line is in a modified cache state, copies the cache line (or entire cache) to an auxiliary storage element, and sets the cache state of the modified cache line to mirrored modified. In this state, if more than one processor core attempts to access the same cache line (exclusive state), ownership is not given to the non-owning core; rather, the copy of the cache line is provided.

When a cache line that is in a mirrored modified state is written back to main memory (e.g., DRAM 212), the mirrored cache line in the auxiliary storage location can be deleted or invalidated.

The example memory device described herein is a DRAM 212, however, other types of memory may be utilized for main memory in accordance with an embodiment. For example, the main memory may be a static random access memory (SRAM) or a flash memory and/or it may be located on a memory module (e.g., a dual in-line memory module or "DIMM") or other card structure. Further, as described herein, the DRAM 212 may actually be implemented by a plurality of memory devices.

LL cache 208 is one example of a cache level that may be used by embodiments to provide mirroring of modified cache lines for memory devices (e.g., DRAM 212), as other cache levels may also be used to provide the mirroring. In one embodiment, a portion of the cache is reserved for mirrored cache lines, with the portion (e.g., size and/or location) being programmable at system start up and/or during system operation. In another embodiment, a maximum number of cache lines are available for mirrored cache lines (and not restricted to specific locations) with the maximum number being programmable at system start up and/or during system operation.

Figure 3:
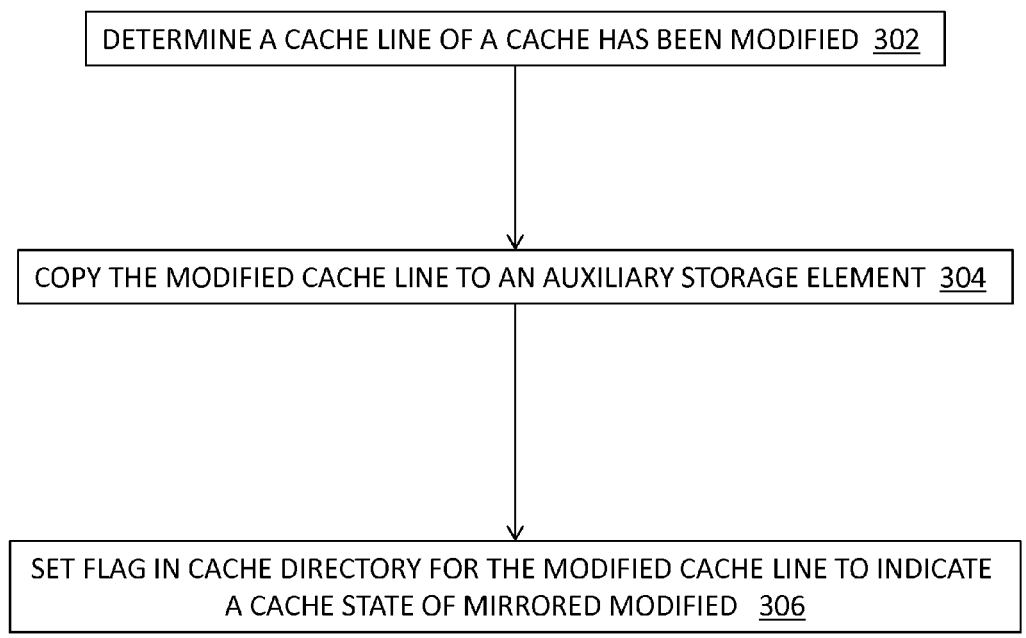
FIG. 3 is a flow diagram of a process for mirroring a cache having a modified cache state in accordance with an embodiment.

FIG. 3 depicts a process flow for mirroring a cache line determined to be in a modified cache state in accordance with an embodiment. In an embodiment, the process flow depicted in FIG. 3 is performed by a combination of logic in the cache coherency controller 211, memory controller 210, and logic in a cache, such as LL caches 206 and 208. The process assumes that the cache coherency controller 211 is monitoring the cache states of designated caches for a memory system.

At block 302, the cache coherency controller 211 determines a cache state of a cache line has been modified. At block 304, the memory controller 210 copies the modified cache line to an auxiliary storage element. Alternatively, the entire cache may be copied. At block 306, the memory controller 210 sets a flag in the cache directory 225 for the modified cache line to indicate a new cache state of mirrored modified.

The cache controller 211 continues to monitor the cache states of the caches, detect any changes made to the cache lines, and copies the modified cache lines to the auxiliary storage.

The embodiment described herein is address mapped cache, however embodiments also apply to content addressable cache.

Technical effects and benefits include the ability to reduce performance issues within a computer system and to reduce system downtime due to corrupted data and system deconfigurations.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
providing a plurality of processors, each of the plurality of processors having a dedicated high-level cache comprising a level one cache, a level two cache, and a level three cache, each of the plurality of processors being communicatively connected to a lower level cache; and
providing a memory controller communicatively connected to the lower level cache, to a main memory, and to a cache coherency controller, wherein the cache coherency controller detects a cache line having a modified cache state and initiates the use of a cache line in an auxiliary location for storing a copy of the cache line, the auxiliary location comprising one of the level three caches, the lower level cache, the main memory, or a hard disk drive,
wherein a cache directory resides in each of the level one caches, each of the level two caches, each of the level three caches, and the lower level cache, the cache directory residing in each of the caches comprising cache lines and a corresponding cache state for each cache line,
wherein at least one of the cache lines of the cache directory comprises a cache state of modified which indicates to the cache coherency controller that a copy of the cache line needs to be made, and wherein at least one of the cache lines of the cache directory comprises a cache state of mirrored modified that indicates that the cache lines stores a copy of a cache line that has been modified at another cache.

2. The method of claim 1, wherein the cache coherency controller monitors the cache states of the caches, detects any modifications made to the cache lines, and copies the modified cache lines to the auxiliary location.

3. The method of claim 1, wherein each of the plurality of processors and the lower level cache are communicatively coupled to a I/O controller via a bus.

4. The method of claim 3, wherein the I/O controller is configured to transmit data to and receive data from a disk drive and a network.

* * * * *